(12) United States Patent
Pulito et al.

(10) Patent No.: US 8,650,133 B2
(45) Date of Patent: *Feb. 11, 2014

(54) ADAPTIVE RATING SYSTEM AND METHOD

(71) Applicant: VineLoop, LLC, Moorestown, NJ (US)

(72) Inventors: Darren Pulito, Moorestown, NJ (US);
Lou Vastardis, Moorestown, NJ (US)

(73) Assignee: Vineloop, LLC, Moorestown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/686,757

(22) Filed: Nov. 27, 2012

(65) Prior Publication Data

US 2013/0185222 A1    Jul. 18, 2013

Related U.S. Application Data

(63) Continuation of application No. 13/023,884, filed on Feb. 9, 2011, now Pat. No. 8,321,355.

(60) Provisional application No. 61/423,309, filed on Dec. 15, 2010.

(51) Int. Cl.
*G06Q 30/00* (2012.01)
*G06Q 99/00* (2006.01)

(52) U.S. Cl.
USPC .......................................... 705/347; 705/319

(58) Field of Classification Search
USPC ................................................ 705/319, 347
See application file for complete search history.

(56) References Cited

U.S. PATENT DOCUMENTS

| | | | |
|---|---|---|---|
| 7,930,302 B2 * | 4/2011 | Bandaru et al. | 707/737 |
| 8,321,355 B2 * | 11/2012 | Pulito et al. | 705/347 |
| 2008/0295226 A1 * | 12/2008 | Schioppa | 2/265 |
| 2009/0239205 A1 * | 9/2009 | Morgia et al. | 434/362 |
| 2010/0082419 A1 * | 4/2010 | Au-Yeung et al. | 705/14.19 |
| 2010/0122293 A1 * | 5/2010 | Craner | 725/40 |
| 2010/0217717 A1 * | 8/2010 | Overby | 705/311 |
| 2011/0252031 A1 * | 10/2011 | Blumenthal et al. | 707/733 |

* cited by examiner

*Primary Examiner* — Scott A Mattia
*Assistant Examiner* — Maria C Santos-Diaz
(74) *Attorney, Agent, or Firm* — Barnes & Thornburg LLP; Thomas J. McWilliams; Edward F. Behm, Jr.

(57) ABSTRACT

The present invention is embodied in adaptive rating methods and systems. The adaptive rating method includes receiving a first rating for a first product from a user, receiving a second rating for a second product from the user, identifying a conflict with a processor by comparing the first rating and the second rating, soliciting feedback from the user to remedy the conflict, and adjusting at least one of the first or second ratings with the processor responsive to feedback from the user. The steps of the method may be embodied in computer executable instructions stored on a non-transient machine readable medium that cause a processor to perform the method when executed by the processor. The system includes a processor configured to perform the steps of the method.

15 Claims, 13 Drawing Sheets

| | Leisure | | | | |
|---|---|---|---|---|---|
| Primary Categories 275 | Restaurants Name/Title | Hotels Name/Title | Wine Name/Title | Beer Name/Title | Spirits Name/Title |
| Sub Categories 276 | Cuisine City Location Price | City Location Features Price | Vineyard Varietal Country Region Vintage Price Winemaker | Label Varietal Country Region Price Brewmaster | Maker Type Country |
| Standard Filters 277a | Rating Level Primary Category Sub Category Degrees of Separation from Expert Geography/Proximity to Product | | | | |
| Advance (Index) Filters 277b | Expert Status (Trust) Quantity of Ratings/UGC (Experience) Community Approval Ratings (Like) | | | | |

| | Entertainment | | | | |
|---|---|---|---|---|---|
| | Movies Name/Title | Music Name/Title | Books Name/Title | TV Shows Name/Title | Video Games Name/Title |
| | Genre Actors Directors Producers | Artist Album Genre | Genre Author Publisher | Genre Actors Producers | Genres Platform Publisher |
| | Rating Level Primary Category Sub Category Degrees of Separation from Expert Geography/Proximity to Product | | | | |
| | Expert Status (Trust) Quantity of Ratings/UGC (Experience) Community Approval Ratings (Like) | | | | |

FIG. 2B

ADAPTIVE RATING SYSTEM AND METHOD

CROSS-REFERENCE TO RELATED APPLICATIONS

This application is a continuation of U.S. patent application Ser. No. 13/023,884 (now U.S. Pat. No. 8,321,355) filed Feb. 9, 2011, and claims priority to U.S. Provisional Patent Application Ser. No. 61/423,309, filed Dec. 15, 2010, entitled Expert Rating System for Social Network Method and System, the entireties of which are expressly incorporated herein by reference as if set forth in their entireties.

BACKGROUND OF THE INVENTION

Social networking websites such as those hosted on Facebook™ and Yahoo!™ provide network services to facilitate interaction between users. Typically, users who sign up for these services are able to establish connections with other users. As the popularity of such network services has increased many social networking websites service millions of users with many individual users having large networks including hundreds or even thousands of connections to other users.

Users of such network services may be interested in requesting information or assistance from other users with whom they have established a connection or other members in the network to whom they don't have an established connection. The development of systems and methods for users of such network services to request and retrieve relevant information from other users within a social network would be useful to users.

SUMMARY OF THE INVENTION

The present invention is embodied in adaptive rating methods and systems. The adaptive rating method includes receiving a first rating for a first product from a user, receiving a second rating for a second product from the user, identifying a conflict with a processor by comparing the first rating and the second rating, soliciting feedback from the user to remedy the conflict, and adjusting at least one of the first or second ratings with the processor responsive to feedback from the user. The steps of the method may be embodied in computer executable instructions stored on a non-transient machine readable medium that cause a processor to perform the method when executed by the processor.

The system includes a processor configured to receive a first rating for a first product from a user, receive a second rating for a second product from the user, identify a conflict with a processor by comparing the first rating and the second rating, solicit feedback from the user to remedy the conflict, and adjust at least one of the first or second ratings with the processor responsive to feedback from the user.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Also, lines without arrows connecting components may represent a bi-directional exchange between these components. Included in the drawings are the following figures:

FIG. 2B is a table depicting exemplary categories and sub-categories for use with the present invention;

DETAILED DESCRIPTION OF THE INVENTION

The inventors have recognized that the growing adoption within social media is creating a growing state of diminished utility for users. As the current social media products are establishing an increasing number of relationships, a state of information overload is beginning to occur. The reason is that the current social media models fail to address each user's true passions, how they learn, and why they try or buy. The inventors have further recognized that users are most strongly influenced by small numbers of individuals with whom they have trusting interpersonal relationships. Thus, larger social circles or social networks do not translate into improved social utility. An aspect of the present invention provides a system that supports the natural human tendency for learning and changing behavior; a system that is rooted in how individual users naturally seek out trusted information resources to provide them with what they deem as valuable information. The system extends the existence of an individual user's relationship beyond their immediate circle of contacts by perpetuating "trusted" knowledge sharing category-based networks extending from their existing social networks. Thus, the value of indirect relationships beyond the first degree of an individual user's social graph is extended so that individual user can receive a greater number of useful: (1) trusted recommendations; (2) trusted search results; and/or (3) trusted answers to questions.

Embodiments of the present invention allow a user of a social network to request information from other users. The information request can include, for example, a question for dissemination to other users, a search request for information maintained in a electronic database, and/or an alert request for information once it is added to the database. In an exemplary embodiment, a user builds one or more category-based networks based on categories they have in common with other network users (e.g., investing, wine, fitness regiments, book-types, movie-types, restaurants, music-types, etc). Users are able to establish a select number of users within each category-based network as trusted information resource contacts (TIRCs; e.g., users they trust most within a specific category and/or from which they desire to receive rating information from). In doing so, users are able to filter valuable user-generated content (UGC; such as questions and answers, reviews, ratings) from a network of trusted resources (e.g., other users they may view as experts) including the user's established TIRCs, the user's established TIRCs' TIRCs, etc.

Figure 1:
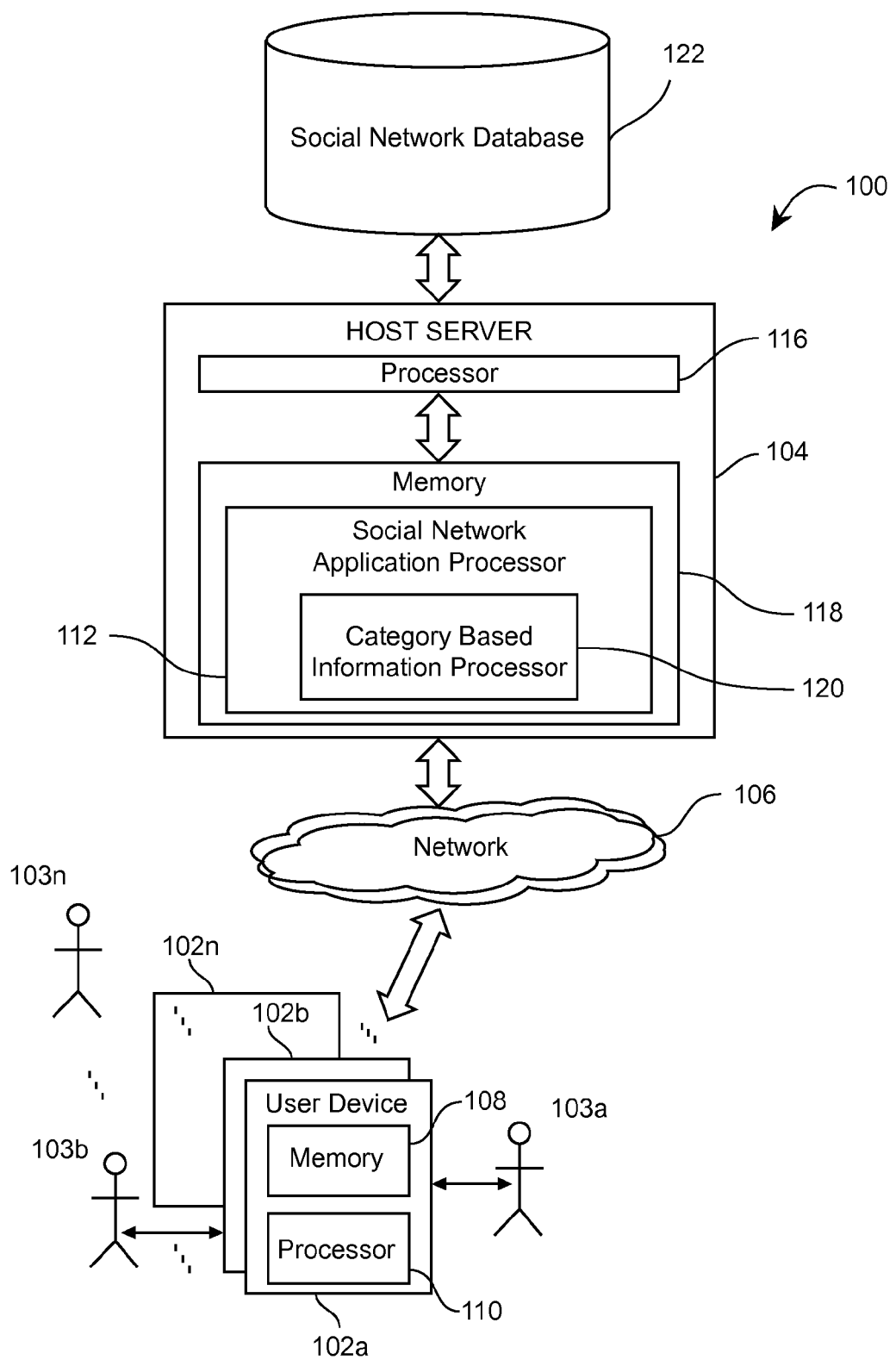
FIG. 1 is a system diagram depicting an exemplary system in accordance with aspects of the present invention.

FIG. 1 is a diagram illustrating an exemplary system 100 in which exemplary embodiments of the present invention may operate. The system 100 includes multiple user devices 102a-n in communication with a host server 104 over a network 106 such as the Internet, an intranet, a wide area network (WAN), a local area network (LAN), or other communication network capable of transporting data. Through user devices 102a-n, users 103a-n can communicate over the network 106 with each other and with other systems and devices coupled to the network 106.

Each of the user devices 102 includes memory 108 and a processor 110 such as a microcontroller, microprocessor, an application specific integrated circuit (ASIC), and/or a state machine coupled to the memory 108. Memory 108 may be a conventional computer-readable medium, such as a random access memory (RAM). In an exemplary embodiment, processor 110 executes computer-executable program instructions stored in memory 108. Suitable memory 108 and processors 110 will be understood by one of skill in the art from the description herein.

User devices 102a-n may also include a number of input/output (10) devices (not shown) such as a mouse, a CD-ROM, DVD, a keyboard, a display, or other input or output devices. Exemplary user devices 102 include personal computers, digital assistants, personal digital assistants, cellular phones, mobile phones, smart phones, pagers, digital tablets, laptop computers, Internet appliances, and processor-based devices. In general, a user device 102a may be any type of device capable of communication with a network 106 and of interaction with one or more application programs. In an exemplary embodiment, user devices 102a-n may operate on any operating system capable of supporting a browser or browser-enabled application, such as Microsoft™ Windows™. The user devices 102a-n shown include, for example, personal computers executing a browser application program such as Microsoft Corporation's Internet Explorer.™

The illustrated host server 104 includes a processor 116 and a memory 118. In an exemplary embodiment, processor 116 executes a social network application program (SNAP) 112 stored in memory 118. SNAP 112 allows users, such as user 103a, to interact with and participate in a computer-based social network (herein "social network"). A social network can refer to a computer network connecting users, such as people or organizations. An example of a social network in which the present invention may be implemented is Facebook.™

A social network can comprise user profiles that can be associated with other user profiles. Each user profile may represent a user and a user can be, for example, a person, an organization, a business, a corporation, a community, a fictitious person, an institution, information source, or other entity. Each profile can contain entries, and each entry can comprise information associated with a profile. Memory 118 may be a conventional computer-readable medium, such as a random access memory (RAM). In an exemplary embodiment, processor 116 executes computer-executable program instructions stored in memory 118. Suitable memory 118 will be understood by one of skill in the art from the description herein.

Host server 104, depicted as a single computer system, may be implemented as a network of computers. Examples of a host server 104 are servers, mainframe computers, networked computers, processor-based devices, and similar types of systems and devices. Processor 110 and processor 116 can be any of a number of computer processors, such as processors from Intel Corporation of Santa Clara, Calif. and Motorola Corporation of Schaumburg, Ill., which will be understood by one of skill in the art from the description herein.

SNAP 112 can include a category-based information processor 120. In an exemplary embodiment, processor 120 enables a user 103 to establish trusted information resource contacts/relationships with other users that are based on categories and to request information from these TIRCs. Processor 120 can cause the display of information provided by one or more users 103 of the social network on a user device 102. Processor 120, in some embodiments, can generate, distribute, and/or update a search record. Multiple processors and other hardware can be provided to perform operations associated with embodiments of the present invention.

Host server 104 also provides access to electronic data storage elements, such as a social network storage element, in the example shown in FIG. 1, an electronic social network database 122, which may be stored in memory 118 of host server 104 or external to host server 104 as illustrated. The social network database 122 may be physically attached or otherwise in communication with the social network engine 112 by way of a network or other connection. The social network database 122 can be used to store users' member profiles including TIRCs of those users. Electronic data storage elements may include any one or combination of methods for storing data, including without limitation, arrays, hash tables, lists, and pairs. Other similar types of data storage devices can be accessed by the host server 104. SNAP 112 can receive data comprising the user profiles from the social network database 122 and can also send data comprising user profiles to the social network database 122 for storage.

It should be noted that the present invention may comprise systems having different architecture than that which is shown in FIG. 1. For example, in some systems according to the present invention, host server 104 may comprise a single physical or logical server. The system 100 shown in FIG. 1 is merely exemplary, and is used to help explain the social network and adaptive rating systems and methods illustrated in FIGS. 2-6.

Figure 2:
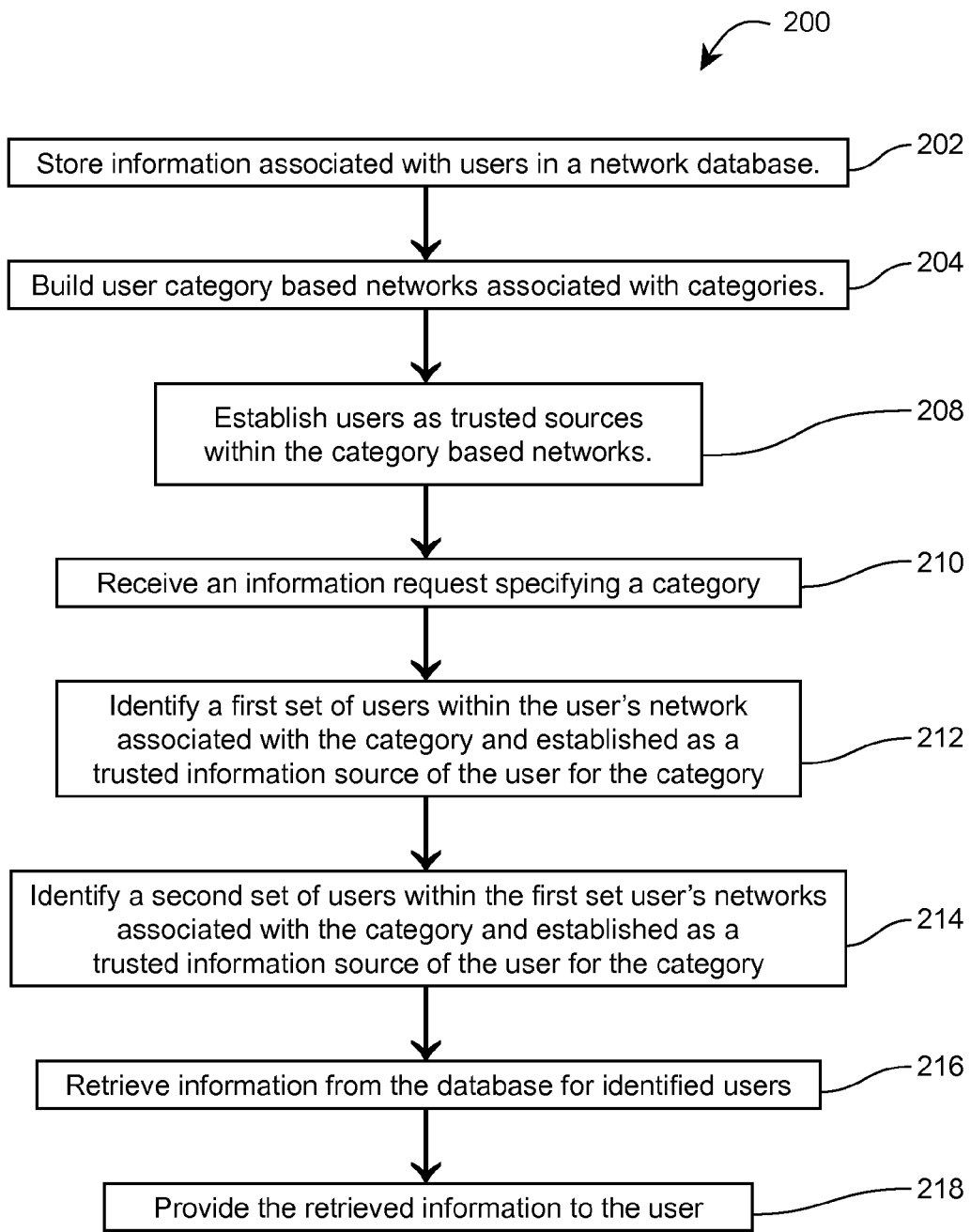
FIG. 2 is a flow chart depicting exemplary steps for requesting and retrieving information in accordance with aspects of the present invention.

FIG. 2 depicts a flow chart 200 of exemplary steps for retrieving information about a category of interest from a social network in accordance with aspect of the present invention. In an exemplary embodiment, the social network includes multiple user networks where each user network includes multiple users. The steps of flow chart 200 will be described with reference to the system 100 depicted in FIG. 1 to facilitate description. Other systems in which the steps of flow chart 200 may be carried out will be understood by one of skill in the art from the description herein.

At block 202, information associated with users are stored in a database. In an exemplary embodiment, information generated by users 103 may be stored in social network database 122. The information may include ratings and reviews of products, answers to questions links, or any other form of user-generated content (UGC). All forms of information may be generated and stored by users of the social network prior to receiving a request for information. Additionally, information generated and stored after a request for information may be used to satisfy a standing request.

Figure 2A:
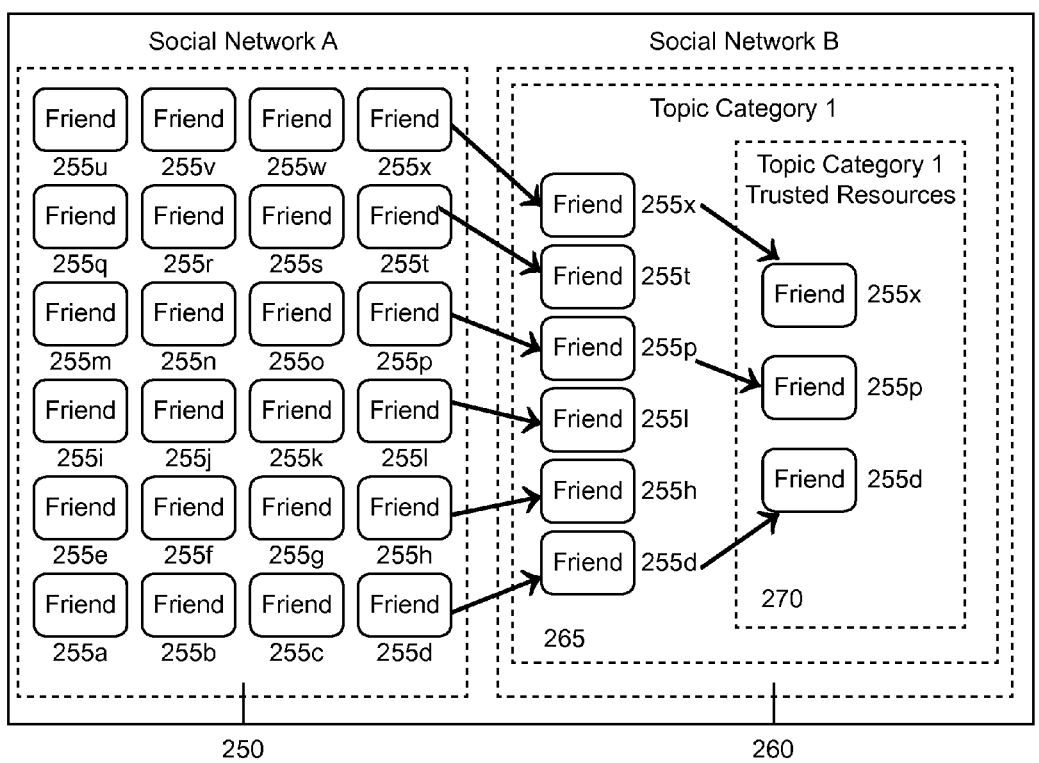
FIG. 2A is a block diagram illustrating the establishment of a category-based network and the establishment of trusted information resource contacts within the category-based network in accordance with an aspect of the present invention.

At block 204, user category-based networks associated with categories are built. FIG. 2a depicts an exemplary user network 250 including multiple contacts/friends 255a-x (24 contacts in the illustrated embodiment) within a user's network. Contacts 255 of the user may be associated with a category such as a category or sub-category (described below) to build a category-based network. In the illustrated embodiment, contacts 255x, t, p, l, h and d are associated with a category (e.g., wine) to build category-based network 265. Step 204 may be performed for every user 103 within social network database 122.

User category-based networks, such as category-based network 265, may be built based on the user associating one or more contacts 255 with a particular category 260. In an exemplary embodiment, the user may unilaterally assign contacts 255 to one or more category-based networks. For example, the host server 104 may create a graphical user interface (GUI) for display on a user device 102. The GUI may display each contact 250 of the user along with a series of check boxes corresponding to categories next to each user. The user may then simply select the appropriate check boxes to associate contacts with a category.

In an alternative exemplary embodiment, bilateral agreement may be necessary to establish a category-based network 265. For example, the host server 104 may create a GUI for display on a user device 102. The GUI may display each contact 255 of the user along with a series of check boxes corresponding to categories next to each user. Selection of category check boxes associated with a particular contact 255 may result in an email message to that contact requesting consent. The contact may then be associated with the category and become a member of the category-based network 265 upon a positive response to the consent request.

FIG. 2B depicts exemplary categories 275 and sub-categories 276 associated with particular categories with which users may be associated. The sub-categories provide finer granularity for categorizing. For example, a category may be "wine" and a subcategory may be "varietal" (Cabernet, Merlot, Zinfandel, etc).

Figure 3:
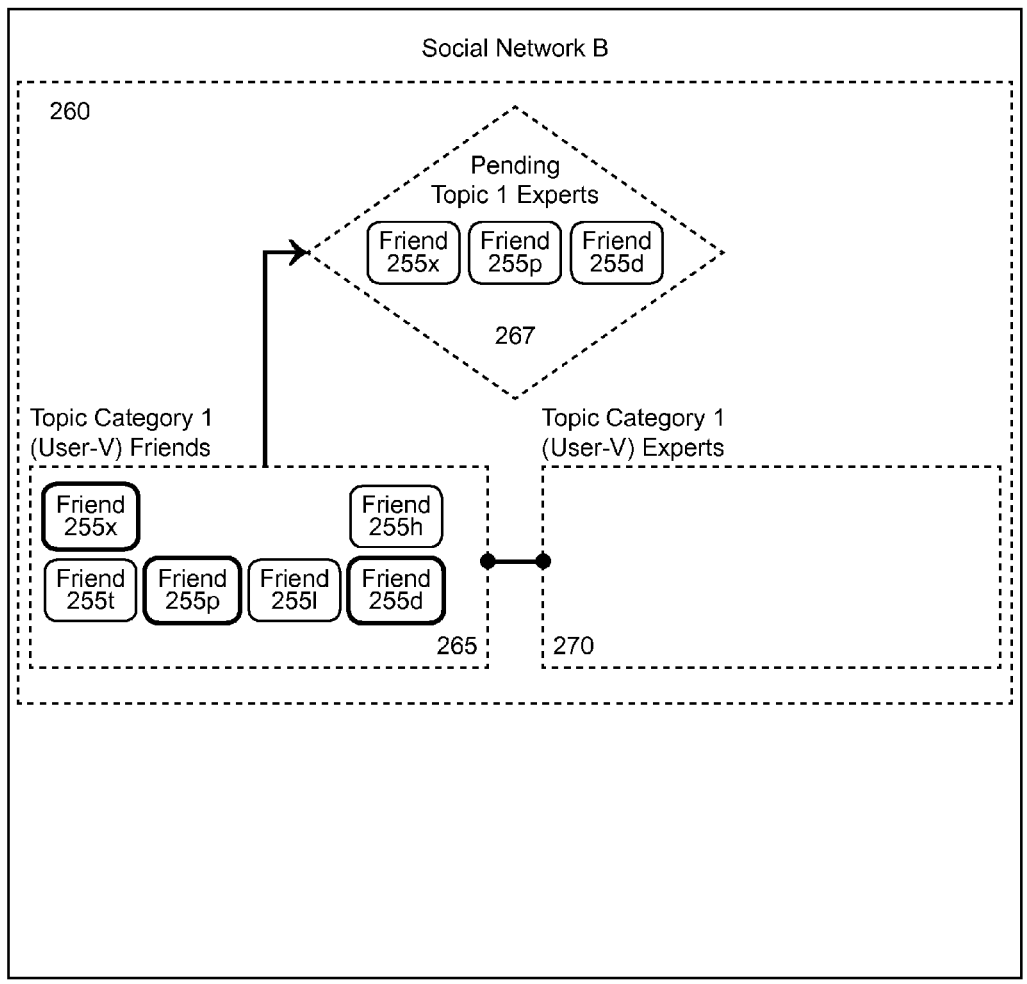
FIG. 3 is a block diagram illustrating a pending category trust request in accordance with aspects of the present invention.
Figure 3A:
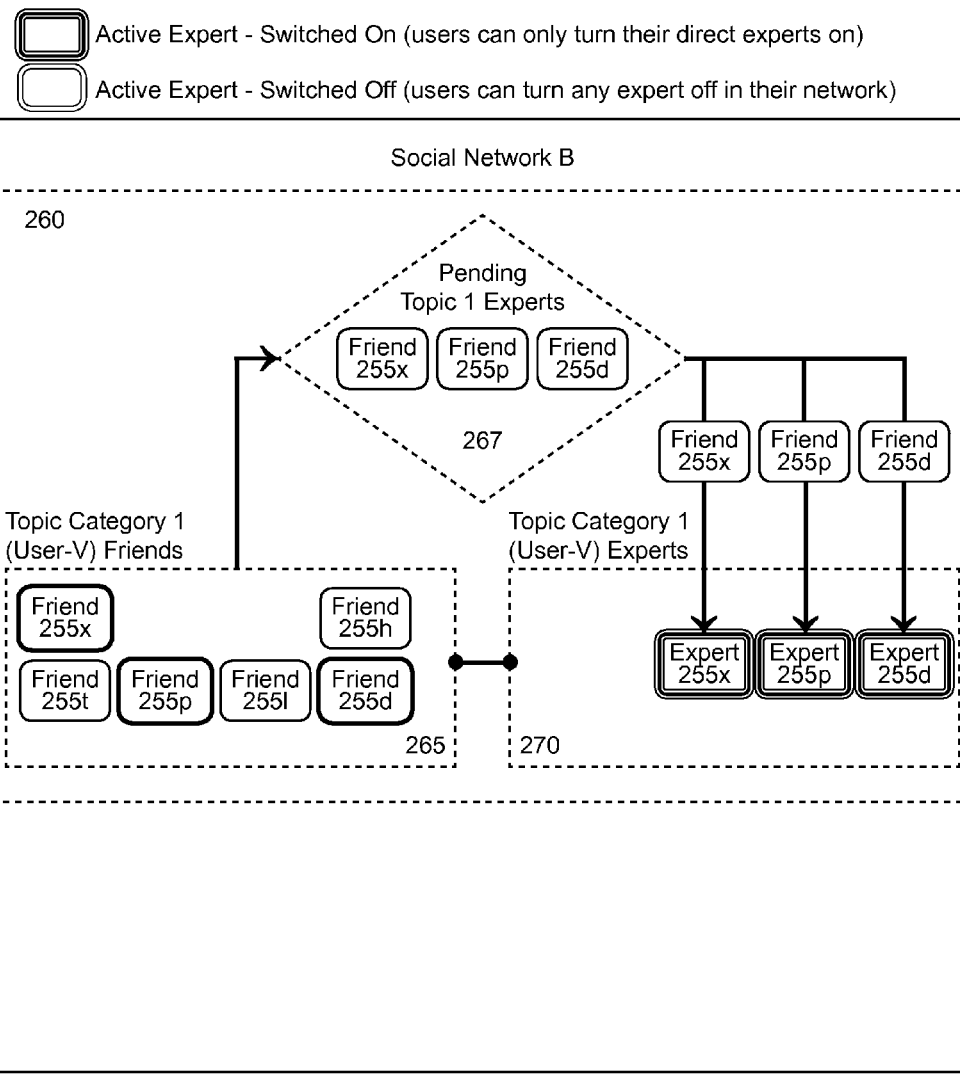
FIG. 3A is a block diagram illustrating established trusted information resource contacts of a user for a category in accordance with aspects of the present invention.

Referring back to FIG. 2, at block 208, contacts are established as TIRCs (e.g., experts) from which the user desires to receive information. The TIRCs form a set 270 of one or more contacts 255 of the user that are associated with the category and are established as TIRCs of the user for that category. In an exemplary embodiment, the user sends a trusted information resource request to one or more contacts 255 for a category/subcategory requesting that those contacts become TIRCs of the user for that category/subcategory. For example, the user may send trusted information resource requests to three of the contacts 255 (e.g., contacts 255x, p, d) within category-based network 265 to become TIRCs of the user for the category/subcategory. The trusted information resource requests for the category are received by the host server 104, which forwards the trusted information resource requests to the intended contacts 255x, p, d and waits for a response. At this point, the trusted information resource requests are pending and a trusted information resource relationship has not been established, which is illustrated in FIG. 3. The host server 104 then establishes each user from which a positive response to the trusted information resource request is received as a TIRC of the user. FIG. 3A depicts the establishment of a set 270 of trusted information resource relationships between the user and contacts 255x, p, d for category-based network 265.

Figure 3B:
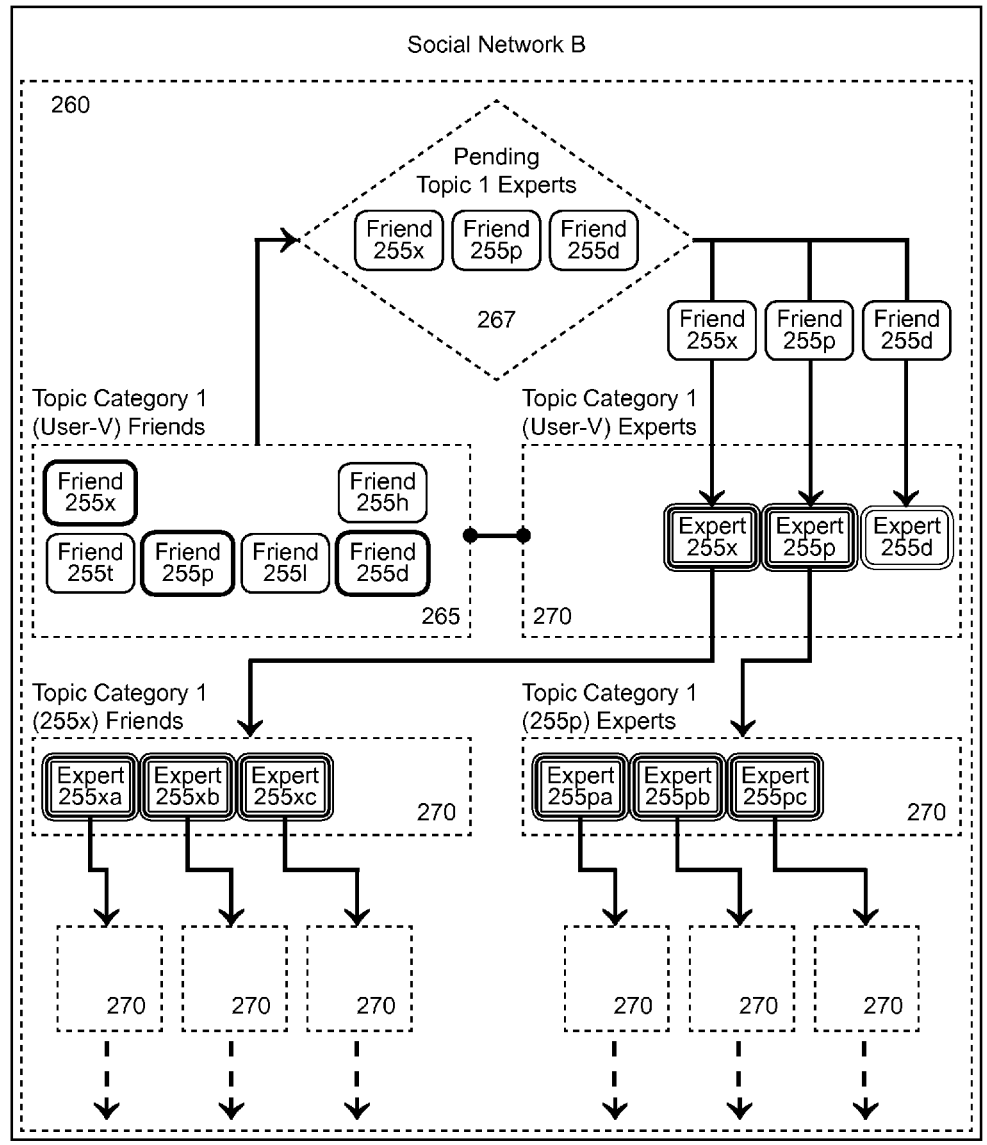
FIGS. 3B and 3C are block diagrams illustrating established trusted information resource contacts of established trusted information resource contacts in accordance with aspects of the present invention.

In an exemplary embodiment, once TIRCs are established, the user can individually turn the TIRCs on (active) and off (inactive) as desired. FIG. 3B illustrates the trusted connections between the user and contacts 255x and p turned on, and the trusted connection to expert 255d turned off. In this arrangement, the user is able to retrieve information from TIRCs 255x and 255p (but not 255d), and from the TIRCs with which contacts 255x and 255p have active trusted connections (e.g., 255xa, xb, xc and 255pa, pb, pc); and from the active TIRCs of contacts 255xa, xb, xc and 255pa, pb, pc, etc.

Figure 3C:
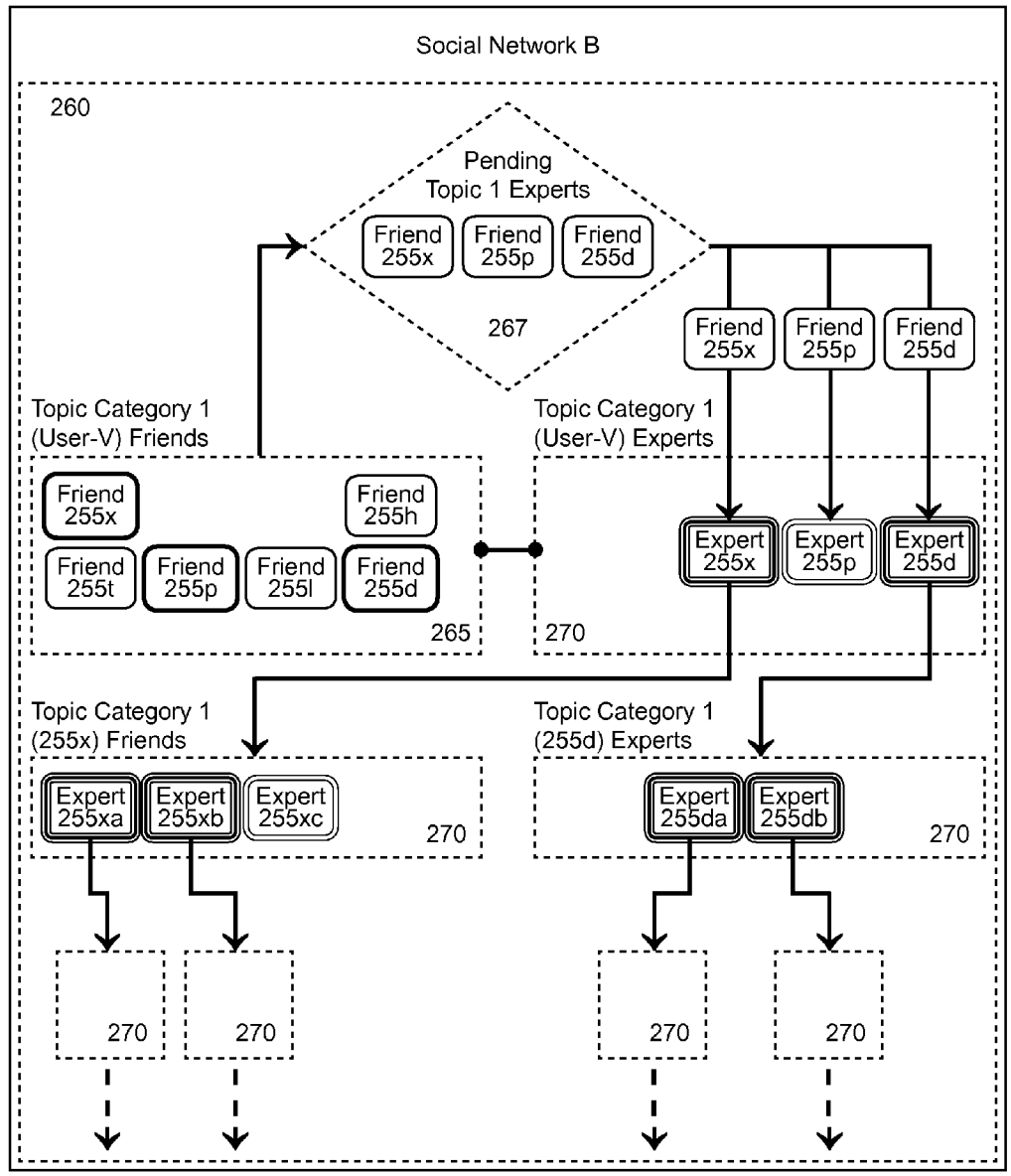

FIG. 3C illustrates the trusted connections between the user and contacts 255x and d turned on and the trusted connection to expert 255p turned off. In this arrangement, the user is able to retrieve information from TIRCs 255x and 255d (but not 255p), and from the TIRCs with which contacts 255x and 255d have active trusted connections (e.g., 255xa, xb, da, and db, but not 255xc); and from the active TIRCs of contacts 255xa, xb, da, and db. In an exemplary embodiment, a contact such as contact 255xc in FIG. 3C may be designated as inactive by the user with which that contact has a trusted information resource connection (e.g., by contact 255x for 255xc).

In an additional embodiment, to improve search results a user requesting the search may designate one or more TIRCs of their TIRCs as inactive for purposes of generating search results for queries by that user. For example, a user may designate contact 255xc as inactive if the user does not want results from that contact (e.g., does not trust that contact's recommendations based on past experience). In accordance with this embodiment, designation of a contact as inactive for the user's queries only renders that contact inactive from the user's viewpoint and does not render that contact inactive as a TIRC of other users (e.g., contact 255xc may remain an active TIRC of contact 255x for contact 255x and other users unless contact 255x designates contact 255xc as inactive.

The number of active TIRCs per category may be limited. In an exemplary embodiment, the number of active TIRCs per category is limited to ten or less and, more preferably, to three or less. Step 208 may be performed for every user 103 within social network database 122.

At block 210, an information request is received that specifies a category. In an exemplary embodiment, the host server 104 receives an information request from a user 103. The information request may include content filtering information such as the standard filters 277a and/or advanced filters 277b set forth in FIG. 2B. The host server 104 may generate and present a GUI (not shown) to the user 103 for submitting an information request. The information request GUI may include a series of check boxes associated with various categories/sub-categories and a submit button. In an exemplary embodiment, an information request may be generated by selecting one or more categories/subcategories and selecting the submit button. Additionally, the GUI may include a text box for entering a question for submission to a user's trusted information resources. The GUI may further include check boxes or other means for entering filter information for standard filters 277a and/or advanced filters 277b.

At block 212, a first set of users within the user's network are identified that are associated with the category (i.e., contacts 255 in category-based network 265) and that are established as TIRCs for that category (i.e., contacts 255 in set 270). In an exemplary embodiment, the host server 104 identifies the first set of users by examining the social network database 122 based on the category specified in the information request and the user's established TIRCs for that category. The first set of users may be thought of as "experts" from the viewpoint of the user.

At block 214, a second set of users within the category-based networks of the first set of users are identified that are associated with the category and that are designated as TIRCs for the category by the first set of users. In an exemplary embodiment, the host server 104 identifies the second set of users by examining the social network database 122 based on the category specified in the information request and the TIRCs established of the first set of users for that category. The second set of users may be thought of as "experts" of the first set of users, e.g., the expert's experts. The steps of block 214 may be repeated to obtain information from TIRCs that are farther removed from the user, e.g., the expert's expert's expert, the expert's expert's expert's expert, and so on.

At block 216, information is retrieved for identified users. In an exemplary embodiment, the host server 104 retrieves information from the database 122 for identified users (e.g., those identified in steps 212 and/or 214) corresponding to the information request. The information may be ratings and/or reviews of products within the selected category (step 210), or answers to questions within the selected category. For example, assume the category is action films. The host server 104 may retrieve all ratings and/or reviews of action films by the TIRCs identified in steps 212 and/or 214. If a user has a question associated with a category, the information may be retrieved by disseminating the question to the identified users and gathering responses from the identified users.

At block 218, retrieved information is provided to a user. In an exemplary embodiment, information retrieved by the host server 104 from the database 122 at block 216 is transmitted to the client device 102 from which the information request was received (step 210) where it may be viewed by the user 103.

The exemplary steps described above enable a user to monitor new ratings, reviews and other UGC of their TIRCs within a desired category and the TIRCs of these TIRCs, etc.; search ratings, reviews and other UGC of TIRCs within a desired category and the TIRCs of these TIRCs, etc.; and send questions to or communicate directly with TIRCs within a desired category and to/with the TIRCs of these TIRCs, etc. Monitoring, searching, and sending functionality is described in further detail below:

Monitoring—user 103 can set personal preferences within the social network to receive information through direct links established through extended category-based networks of users identified as TIRCs within those category-based networks. The information from these TIRCs can include ratings, reviews, links, UGC, etc. Within this mode of functionality the user receives the information automatically, e.g., periodically or as it is posted by users. The information can be filtered by criteria such as set forth in standard filters 277a and/or advance filters 277b (FIG. 2B) including by way of non-limiting example, the degrees of separation from the TIRC, the status of active TIRC designations, the number of UGC posts, ratings or reviews within a specific topic category by each TIRC, and the social network communities' approval or rating of a TIRC's UGC, ratings, reviews, etc.

As an example, a user may set their "monitor" preferences to notify them of reviews down to the third degree of separation by TIRCs within category-based networks for a particular category (e.g., Italian restaurants) with a particular rating (e.g., above 9.3).

Figure 3D:
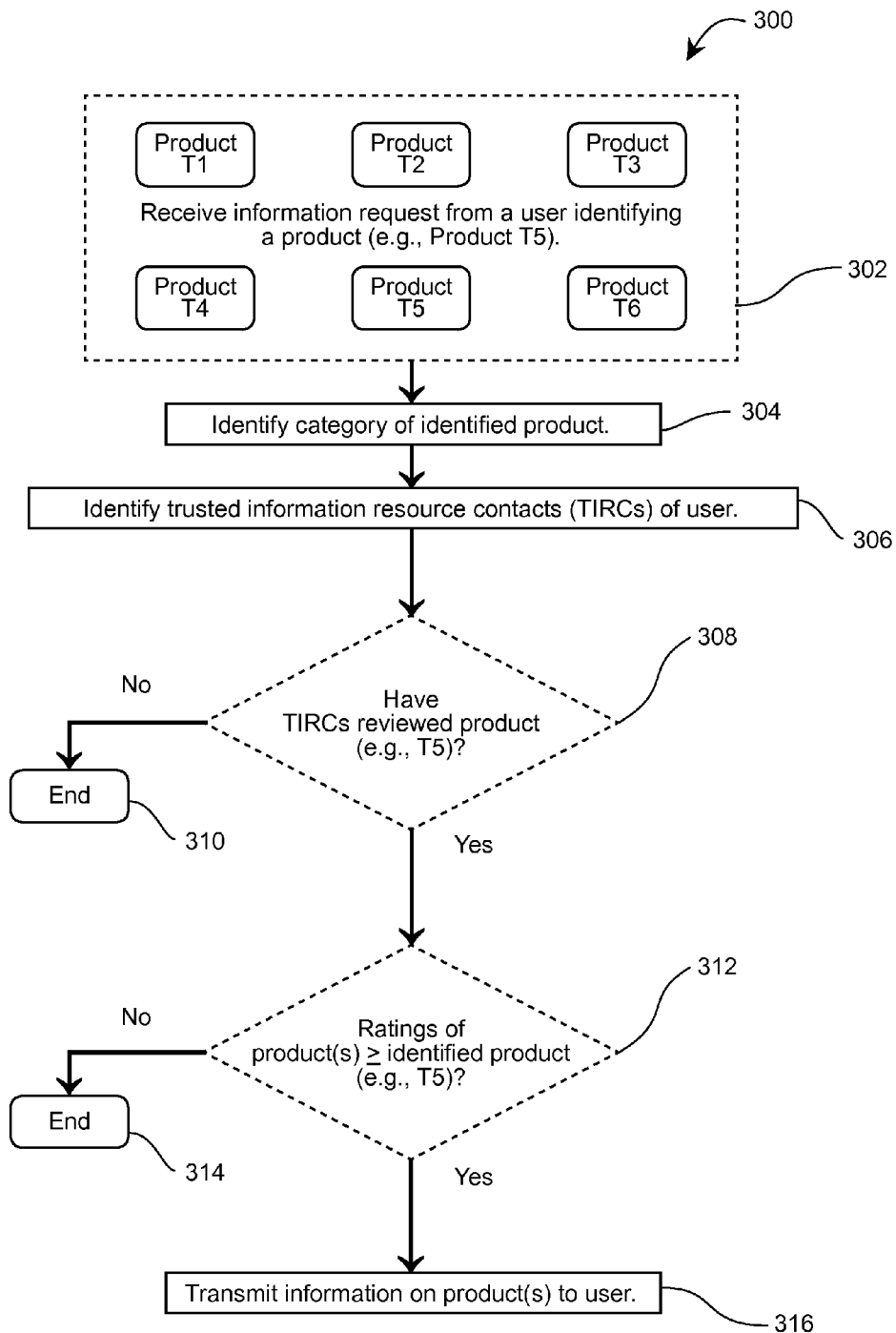
FIG. 3D is a flow chart of exemplary steps for requesting information on other products related to a product of interest to the user in accordance with an aspect of the present invention.

FIG. 3D depicts a flowchart 300 of exemplary steps for monitoring reviews in accordance with one aspect of the present invention. At block 302, a information request is received (e.g., at host server 104) from a user identifying a particular product (e.g., product T5 from a group of products including products T1-T6). At block 304, a category/subcategory associated with the identified product is identified. For example, the host server 104 may identify the category/subcategory (e.g., Napa Cabernets) associated with product T5 by comparing a product identifier (e.g., UPC code) for product T5 with entries in a database.

At block 306, TIRCs of the user for the identified category are identified. In an exemplary embodiment, host server 104 identifies TIRCs for the identified category as described above for blocks 212 and 214 of flow chart 200.

At block 308, host server 304 determines if the TIRCs have reviewed the product identified by the user. In an exemplary embodiment, host server 104 compares a product identifier of the identified product to product identifiers of all products reviewed by the TIRCs. If there is not a match, processing ends at block 310. If there is a match, indicating that one or more of the TIRCs have reviewed the identified product, processing proceeds at block 312.

At block 312, host server 304 determines for each TIRC that has reviewed the identified product whether they rated another product the same or higher than the identified product. If no TIRC has rated any other products within the category equal to or greater than they rated the identified product, processing ends at block 314. If one or more TIRCs rated one or more other products equal to or greater than the identified product, processing ends at block 316 with information for those products being transmitted to the user device 102 of the user 103 requesting the information. This process allows a user to quickly and easily identify other products that the user may wish to try because they were rated by the user's expert, expert's expert, and/or expert's expert's expert, as equal to or better than the identified product.

Searching—user 103 can search for ratings, reviews, user generated content, and published content by keywords, pictures, dimensional barcodes, non-dimensional barcodes, UPC codes, geocode, GPS coordinates, and more, through direct links established through extended category-based networks of users identified as TIRCs within a category. Within this mode of functionality the user actively requests the information. The information can be filtered by criteria such as set forth in standard filters 277a and/or advanced filters 277b (FIG. 2B), including by way of non-limiting example, the degrees of separation from the TIRC, the status of active TIRC designations, the number of UGC posts, ratings or reviews within a specific topic category by each TIRC, and the social network communities' approval or rating of a TIRC's UGC, ratings, reviews, etc.

As an example, a user may search for ratings, reviews, or other valuable UGC by scanning the barcode on Malcom Gladwell's book "Outliers" in order to receive relevant information from up to the fifth degree of separation within his trusted resource or expert category-based network for books.

Q&A'ing—user 103 can send questions to be answered through direct links established through extended category-based networks of users identified as TIRCs within a category. Within this mode of functionality the user actively requests answers to questions. The TIRC can filter questions to answer based on, for example, the degrees of separation from the questioning user. The answers can be filtered by criteria such as set forth in standard filters 277a and advance filters 277b (FIG. 2B), including by way of non-limiting example, the degrees of separation from the TIRC, the status of active TIRC designations, the social network communities' approval or rating of a TIRC's answers, and other indications of credibility or status.

As an example, a user may send a question out to his trusted resource network for wine, "I am going to San Francisco next month. If I have two days in Napa, what wineries should I try to schedule a tasting?"

Another aspect of the present invention relates to an adaptive rating system and method that ensures that ratings of entities (e.g., (product, person, service, experience, etc.) remain relevant for a user as that user's level of experience matures. For example, a user rating a bottle of wine may have a different rating opinion after having rated 50 bottles of wine than after rating three bottles of wine. The present invention enables past and/or new ratings to be automatically adjusted in order to make them more relevant.

Figure 4:
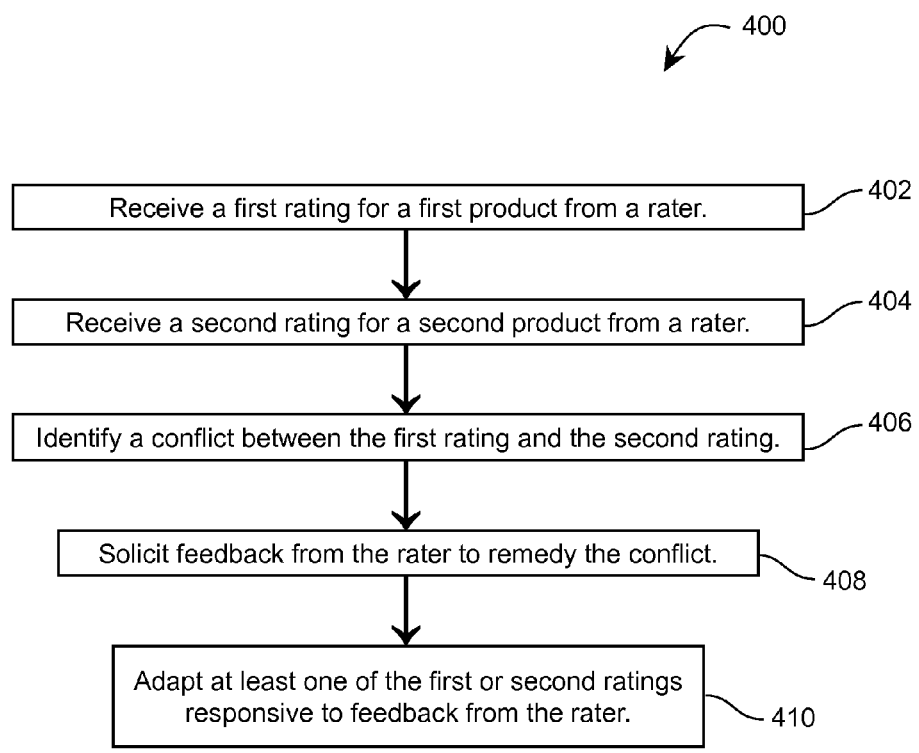
FIG. 4 is a flow chart of exemplary steps for adapting a rating scale in accordance with aspects of the present invention.
Figure 4A:
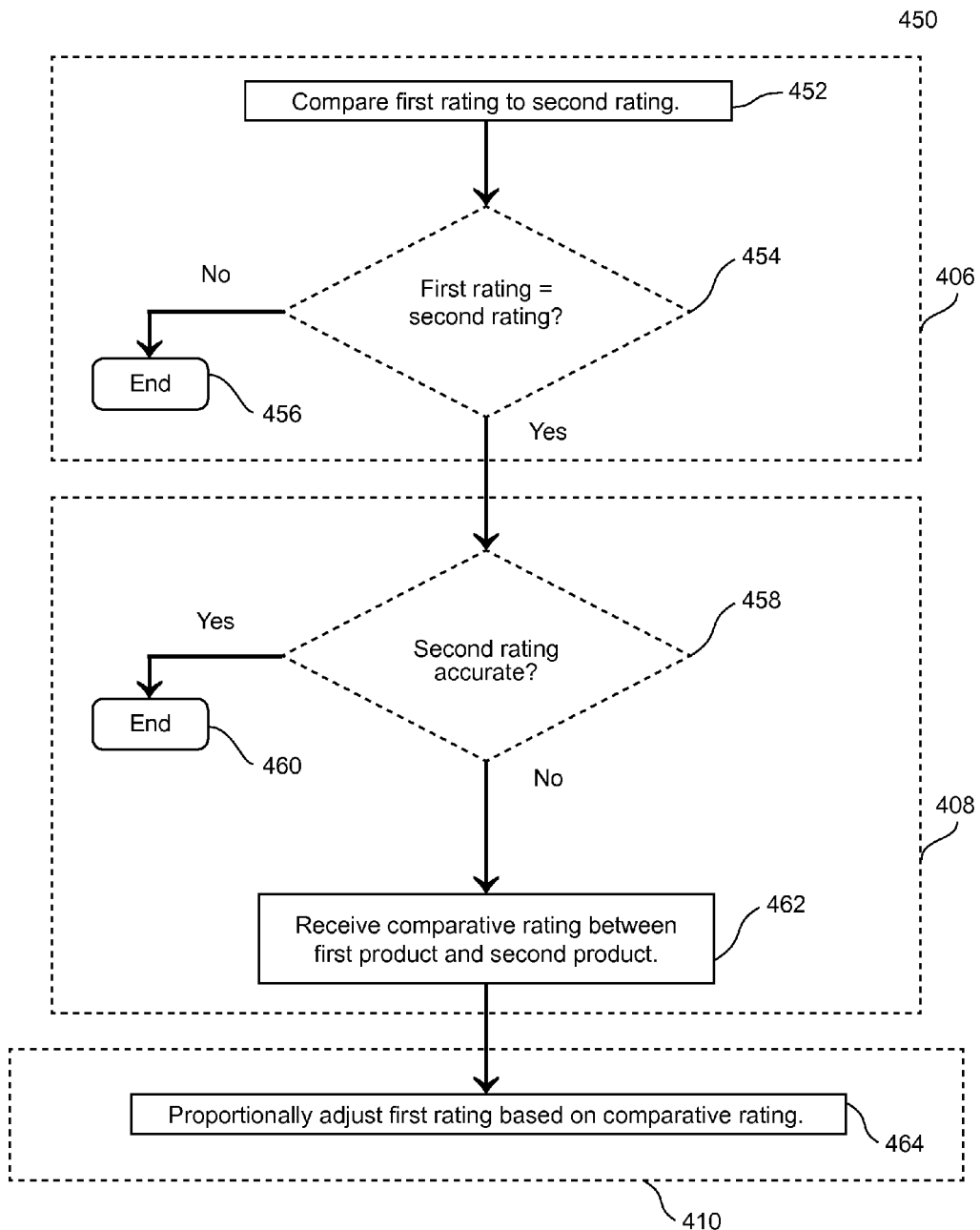
FIG. 4A is a flow chart of exemplary sub-steps for performing steps of the flow chart of FIG. 4.

FIG. 4 depicts a flow chart 400 of exemplary steps for adapting ratings and FIG. 4A depicts a flow chart 452 of exemplary sub-steps within the steps of flow chart 400. The steps of flow charts 400 and 450 will be described with reference to the system 100 depicted in FIG. 1 to facilitate description. Other suitable systems will be understood by one of ordinary skill in the art from the description herein.

At block 402, a first rating for a first product is received from a user. The rating may be a rating on a scale of 1 to 10 (e.g., a nine) for a product within a category or within a subcategory (e.g., a wine or a California Pinot Noir). In an exemplary embodiment, processor 116 may be coupled to a receiver (not shown) that receives the rating from a user 103 via user device 102 over network 106.

Figure 5A:
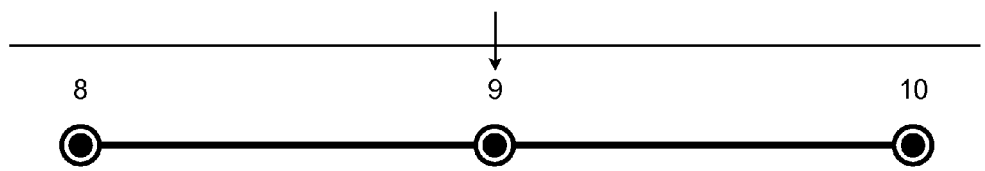
FIGS. 5A, 5B, and 5C are illustrations of a rating scale in accordance with aspects of the present invention.

At block 404, a second rating for a second product is received from the user. The rating may be a rating on a scale of 1 to 10 (e.g., a nine) for another product within the category or subcategory (e.g., a wine or a California Pinot Noir). In an exemplary embodiment, processor 116 may be coupled to a receiver (not shown) that receives the rating from the user 103 via user device 102 over network 106. FIG. 5A depicts a user attempting to rate a second/new product that same as a first/benchmark product (e.g., as a "9").

Referring back to FIG. 4, at block 406, a potential conflict is identified between the first rating and the second rating. In an exemplary embodiment, processor 116 identifies the potential conflict. FIG. 4A depicts exemplary sub-steps for identifying a potential conflict (step 406). At sub-step 452, processor 116 compares the first rating to the second rating. At sub-step 454, processor 116 determines if the first rating equals the second rating. If the ratings are equal, processor 116 identifies a potential conflict and processing proceeds at block 408. If the ratings are not equal, processing ends at block 456.

At block 408, feedback is solicited from the user to remedy the potential conflict. In an exemplary embodiment, processor 116 solicits feedback to remedy the potential conflict.

FIG. 4A depicts exemplary sub-steps for soliciting feedback to remedy the potential conflict (step 408). At sub-step 458, processor 116 determines if the second rating is accurate based on the current rating scale for the category. The current rating scale includes at least one rating of a product (e.g., the first rating for the first product). In an exemplary embodiment, processor 116 sends a first inquiry to the user asking if the second rating is accurate based on the current rating scale (e.g., should the second product have the same rating as the first product). If the second rating is inaccurate (e.g., no, the first and second products are not equivalent to the user rating the products, processing proceeds at block 462. If the second rating is accurate (e.g., yes, the first and second products are essentially equivalent to the user rating the products), processing ends at block 460.

Figure 5B:
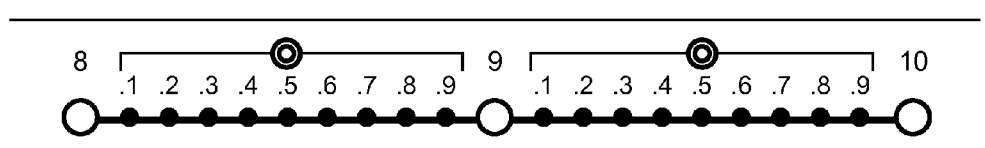

At sub-step 462, processor 116 receives a comparative rating between the first product and the second product. In an exemplary embodiment, processor 116 sends a rating scale such as depicted in FIG. 5B for display by user device 102 to solicit feedback from user 103. The depicted rating scale provides a number of sub-intervals in the vicinity of the first product rating for selection by user 103. For example, if the second product is a little better than the first product and the first product has a rating by user 103 of "9", the user may select a slightly higher rating, e.g., "9.5" on the rating scale. In this case, the comparative rating would be "0.5" better. Similarly, if the second product is a little worse than the first product, the user may select a slightly lower rating, e.g., "8.5" on the rating scale. In this case, the comparative rating would be "0.5" worse. The user may enter the comparative rating in other well known manners, e.g., by typing in a comparative value or other value from which a comparative value may be obtained.

At block 410, the first or second rating is adapted responsive to the feedback solicited from the user. In an exemplary embodiment, processor 116 adapts the first or second rating. FIG. 4A depicts an exemplary sub-step for adapting that rating of the first or second rating (step 410). At step 464, processor 116 proportionally adjusts the first rating based on the comparative rating. In an exemplary embodiment, the rating of a first product is only adjusted when the first product has the maximum value rating on the rating scale (e.g., a value of "10" on a ten-point scale) and a maximum value rating is received for a second product that they user believes should have a higher rating than the first rating.

Figure 5C:
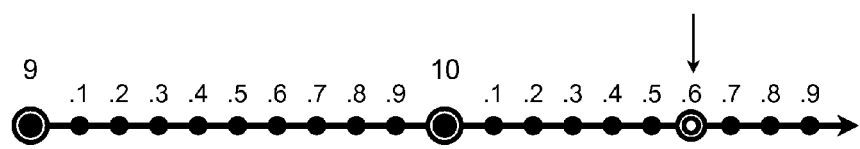

As an illustrative example, consider a first product having a rating of 10 as previously rated by the user. If the user attempts to rate a second product as a 10, similar to as illustrated in FIG. 5A, the system (e.g., processor 116) will identify a conflict. Feedback will then be solicited from the user to determine if the second product should have the same rating as the first product. If the user indicates that it should not have the same value, the user submits a comparative rating of the second product to the first product, e.g., a rating of 9.1-9.9 or 10.1-10.9. In an exemplary embodiment, if a rating of 10.1 to 10.9 were received from the user (e.g., 10.6 as illustrated in FIG. 5C), the second product would then be established as a benchmark for a rating of 10 and the first product (and any other previously rated products for the category) would be proportionally re-rated, e.g., by processor 116. For example, if the first product had a rating of 10 and the second product was given a comparative rating of 10.6, the first product would be given a rating of 9.4 (10.0-0.6=9.4) and the second product would be established as a 10. It will be understood that the system could be applied to many ratings for many products, in which case all the previously rated products may be automatically adjusted in a manner similar to the first product.

For example, as a first step (STEP ONE) ratings may be received by the host server 104 from a user 103 rating multiple products within a category, e.g., product 1=3, product 2=5, and product 3=8. The host server 104 may then proportionally adjust the ratings of the products to a standardized scale in which the rating of the highest rated product is set to the top value of the standardized scale and the ratings of the other products are proportionally adjusted. For example, if the standardized scale is a ten-point scale, product 3 may be set to 10 and products 1 and 2 may be proportionally adjusted, e.g., product 1 equals 4(3/8*10=3.75) and product 2 equals 6(5/8*10=6.25). Next (STEP THREE), the host server 104 receives a rating for a product within the category from the user 103 that has a rating higher than the highest rated product within that category, e.g., product 4 equals 10.9. Finally (STEP FOUR), the host server 104 adjusts the new rating to the highest rating and proportionally adjusts the other ratings. For example, product 4 is set equal to 10; product 1 is set equal to 4 (Old Score-Old Score*Adjustment Factor=Old Score-Old Score*(Max benchmark for 10−10)/10=Old Score-Old Score*(10.9−10)/10=4−4*0.09=3.64); products 2 is set equal to 5 (Old Score-Old Score*Adjustment Factor=Old Score-Old Score*(Max benchmark for 10−10)/10=Old Score-Old Score*(10.9−10)/10=6−6*0.09=5.46); and product 3 is set equal to 9(Old Score-Old Score*Adjustment Factor=Old Score-Old Score*(Max benchmark for 10−10)/10=Old Score-Old Score*(10.9−10)/10=10−10*0.09=9.1). In another embodiment, ratings are proportionally adjusted whenever a potential conflict is identified and a comparative rating (e.g., higher and/or lower) is received from a user.

Aspects of the adaptive rating system may include by way of non-limiting example:

a) A rating system where the entity (product, person, service, experience, etc) with the highest rating serves as the benchmark for which all lower rated products or experiences are ranked against within a specific category.

b) A process that requires the user to rate any new entities in relation to the value of current benchmarks within a specific category.

c) A rating system where a process requires the user, when attempting to rate an entity that has an equal rating to an existing entity, to confirm that the rating of the entity is truly equal, where if the rating of the new entity is not equal, the rating of the new entity has to be set either greater than or less than the previous benchmark for that entity.

d) A process that when the user indicates that the rating of a new (or re-rated) entity is greater than the current highest benchmark, all the rating of entities weighted in relation to the former benchmark are adjusted proportionally.

The present invention is capable of adjusting ratings as a user's tastes mature and experience within a category/subcategory evolves, while keeping scores based on a relative scale. For example, a user tries a mid-tier Bordeaux as one of their first wine experiences and give it a 10. As the user tries other wines they do not enjoy as much they will rate them less than 10 (using the mid-tier Bordeaux as the top of the scale). The user may eventually try a Bordeaux they enjoy more than any other he has previously experienced. When he tries to give it a score of 10, the adaptive rating system/method requires him to rate this Bordeaux in comparison to the mid-tier Bordeaux that is currently serving as his benchmark for "10". If the user feels they are equal, both remain a 10. If the user rates the new Bordeaux greater than the current standing mid-tier Bordeaux (e.g. 10.5), the 10.5 Bordeaux becomes the new benchmark for "10". The previous mid-tier Bordeaux that represented 10, along with all the wines that were rated in comparison to the mid-tier Bordeaux are automatically adjusted in relation to the new 10 point scale now established by the 10.5 Bordeaux. By adapting the rating scale (maintaining a True10™ rating system), the value of an individual rating becomes significantly more valuable and relevant to users within a network—making one's own ratings more accurate to themselves, and more meaningful and relevant to others.

The adapted score makes an expert's ratings or recommendations more relevant, which can be further enhanced by considering additional features, including, but not limited to:

a trust index: how many people directly trust a person as a TIRC (e.g., expert) for a specific category.

a like index: the degree to which other users "like" the answers, recommendations, and/or ratings of an expert.

an experience index: how many products the expert has rated, questions they have answered, etc.

For example, a reviewer/expert may be evaluated on a scale of 0 to 10 based on the following four characteristics: (1) number of reviews written ("WRITTEN"), (2) number of reviews read by other users ("READ"), (3) number of times identified as a TIRC by other users ("EXPERT"), and (4) number of times reviewed were identified by other users as helpful ("HELP"). For each characteristic, a maximum point level (e.g., 10) may be given to a reviewer/expert with the largest number of reviews/customer indications. Each evaluation characteristic may be assigned a weight coefficient correlated with its contribution to an overall evaluation to obtain a final evaluation score, e.g., ranging from 0 to 10. Maximum values for one or more characteristics may be designated. In one example, WRITTEN has a weight of $0.2(K_W=0.2)$, READ has a weight of $0.5(K_R=0.2)$, EXPERT has a weight of $0.5(K_E=0.5)$, and HELP has a weight of $0.5(K_H=0.1)$. Input variables may include: (1) i, reviewer's index (i=0 . . . N where N is the total number of reviewers); (2) $W_i$, number of reviews written by the ith reviewer; (3) $W_{max}$, maximum number of reviews written by a reviewer/expert; (4) $R_i$, number of reviews by ith reviewer/expert that were read by other users; (5) $R_{max}$, maximum number of ith reviewer/expert read reviews; (6) $E_i$, number of times ith reviewer/expert identified as a TIRC by other users; (7) $E_{max}$ maximum number of TIRC identifications; (8) $H_i$, number of reviews by ith reviewer/expert identified as helpful; (9) $H_{max}$, maximum number of reviews by ith reviewer/expert identified as helpful. An exemplary algorithm for determining a weight of each reviewers/experts, i, may be as set forth in equation (1).

$$EV = K_W \frac{W_i}{W_{max}} 10 + K_R \frac{R_i}{R_{max}} 10 + K_E \frac{E_i}{E_{max}} 10 + K_H \frac{H_i}{H_{max}} 10 \qquad (1)$$

Figure 6A:
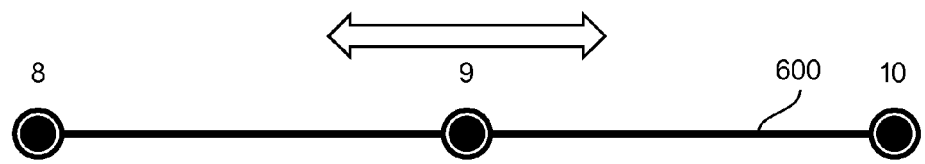
FIGS. 6A and 6B are illustrative representations of an exemplary comparative rating scale in accordance with an aspect of the present invention.
Figure 6B:
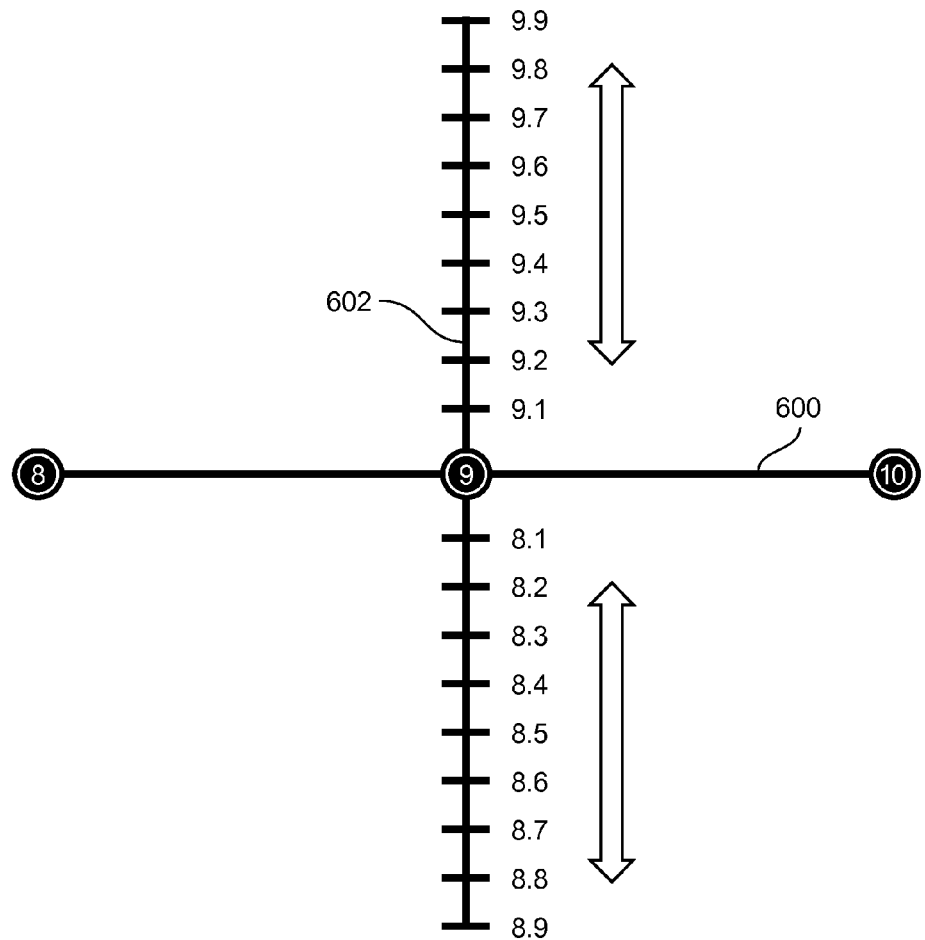

FIGS. 6A and 6B depict an exemplary user interfaces for rating products. In FIG. 6A, a user is presented with a portion of a rating scale 600, e.g., integers 8, 9, and 10 of a ten-point scale. The host server 104 may present the rating scale horizontally on a user device 102. A user 103 may select a rating by moving an indicator along the rating scale 600 and selecting a particular point on the rating scale when the position of the indicator corresponds to the desired rating. For example, the user may utilize a user input device such as a mouse (not shown) to move the indicator and may depress a key on the mouse to make a rating selection. If a rating conflict is identified, e.g., by host server 104 as described above with reference to block 458 (e.g., the user tries to rate a new product as a "9" and there is an existing products rated as a "9"), the user is presented with a comparative rating scale such as depicted in FIG. 6B for use in making a comparative rating. The host server 104 may present the comparative rating scale 602 in an orientation other than the orientation of the rating scale 600, e.g., vertically, on a user device 102. In the illustrated embodiment, comparative rating scale 602 has finer granularity than rating scale 600. The user may then be required to select a comparative rating on the comparative rating scale 602 between the next value greater "10" and the next value lower "8," e.g., between 8.1 and 9.9, using an input device such as a mouse moving vertically along the comparative rating scale 602.

It is contemplated that one or more of the various components and steps described above may be implemented through software that configures a server to perform the function of these components and/or steps. This software may be embodied in a non-transient machine readable storage medium, e.g., a magnetic disc, an optical disk, a memory-card, or other tangible medium capable of storing instructions. The instructions, when executed by computer, such as a server, cause the computer to execute a method for performing the function of one or more components and/or steps described above.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An adaptive rating method comprising:
   receiving a first rating for a first product from a user;
   receiving a second rating for a second product from the user;
   wherein the first and second ratings are in accordance with a predetermined scale;
   identifying a conflict with a processor by comparing the first rating and the second rating;
   soliciting feedback from the user to remedy the conflict; and
   adjusting at least one of the first or second ratings with the processor responsive to feedback from the user, wherein the adjusting comprises decreasing one of the first rating and the second rating on the predetermined scale while maintaining the other rating constant.

2. The method of claim 1, wherein the identifying step comprises:
   comparing the first and second ratings; and
   identifying a conflict if the first and second ratings are equal.

3. The method of claim 1, wherein the soliciting step comprises:
   sending a first inquiry to the user asking if the first rating is incorrect;
   receiving a response from the user that the first rating is incorrect;
   sending a second inquiry to the user soliciting a comparative rating between the first product and the second product; and
   receiving the comparative rating from the user.

4. The method of claim 3, wherein the step of sending the second inquiry includes:
   sending a rating scale depicting the first rating for the first product; and
   requesting that the user identify the comparative rating for the second product to the first product.

5. The method of claim 3, wherein the adapting step comprises:
   proportionally adjusting the first rating based on the comparative rating.

6. An adaptive rating system comprising:
   a receiver that receives a first rating for a first product from a user and a second rating for a second product from the user, wherein the first and second ratings are in accordance with a predetermined scale;
   a processor coupled to the receiver, the processor configured to identify a conflict by comparing the first rating and the second rating, solicit feedback from the user to remedy the conflict, and adjust one of the first or second ratings responsive to feedback from the user, wherein the adjustment comprises decreasing one of the first rating and the second rating on the predetermined scale while maintaining the other rating constant.

7. The system of claim 6, wherein the processor identifies the conflict by comparing the first and second ratings and identifying a conflict if the first and second ratings are equal.

8. The system of claim 6, wherein the processor solicits feedback by sending a first inquiry to the user asking if the first rating is incorrect, receiving a response from the user that the first rating is incorrect, sending a second inquiry to the user soliciting a comparative rating between the first product and the second product, and receiving the comparative rating from the user.

9. The system of claim 8, wherein the processor sends the second inquiry by sending a rating scale depicting the first rating for the first product and requesting that the user identify the comparative rating for the second product to the first product.

10. The system of claim 8, wherein the processor adapts the rating scale by proportionally adjusting the first rating based on the comparative rating.

11. A non-transient machine readable storage medium storing instructions which, when executed by a sewer, cause the server to execute an adaptive rating method, the method comprising:
    receiving a first rating for a first product from a user;
    receiving a second rating for a second product from the user;
    wherein the first and second ratings are in accordance with a predetermined scale;
    identifying a conflict with a processor by comparing the first rating and the second rating;
    soliciting feedback from the user to remedy the conflict; and
    adjusting one of the first rating and the second rating with the processor responsive to feedback from the user, wherein the adjusting comprises decreasing one of the first rating and the second rating on the predetermined scale while maintaining the other rating constant.

12. The non-transient machine readable storage medium of claim 11, wherein the Identifying step comprises:
    comparing the first and second ratings; and
    identifying a conflict if the first and second ratings are equal.

13. The non-transient machine readable storage medium of claim 11, wherein the soliciting step comprises:
    sending a first inquiry to the user asking if the first rating is incorrect;
    receiving a response from the user that the first rating is incorrect;
    sending a second inquiry to the user soliciting a comparative rating between the first product and the second product; and
    receiving the comparative rating from the user.

14. The non-transient machine readable storage medium of claim 13, wherein the step of sending the second inquiry includes:
    sending a rating scale depicting the first rating for the first product; and
    requesting that the user identify the comparative rating for the second product to the first product.

15. The non-transient machine readable storage medium of claim 13, wherein the adapting step comprises:
    proportionally adjusting the first rating based on the comparative rating.

* * * * *